United States Patent [19]

Pfeiffer et al.

[11] Patent Number: 4,671,575
[45] Date of Patent: Jun. 9, 1987

[54] DECORATIVE WHEEL TRIM FOR AUTOMOBILE WHEEL RIM

[75] Inventors: Otto Pfeiffer, Keilor; Drago Gnezda, Footscray, both of Australia

[73] Assignee: Edson Industries Pty., Ltd., South Melbourne, Australia

[21] Appl. No.: 639,928

[22] PCT Filed: Dec. 14, 1983

[86] PCT No.: PCT/AU83/00185
§ 371 Date: Aug. 16, 1984
§ 102(e) Date: Aug. 16, 1984

[87] PCT Pub. No.: WO84/02310
PCT Pub. Date: Jun. 21, 1984

[30] Foreign Application Priority Data
Dec. 16, 1982 [AU] Australia .............. PF7297

[51] Int. Cl.⁴ .............................. B60B 7/02
[52] U.S. Cl. ...................... 301/37 TP; 301/37 R; 301/37 P; 301/37 B
[58] Field of Search ............ 301/37 R, 37 B, 37 PB, 301/37 TP, 37 C, 37 CD, 37 P, 37 T, 108 R, 108 A

[56] References Cited
U.S. PATENT DOCUMENTS

| 2,279,331 | 4/1942 | Lyon. | |
|---|---|---|---|
| 2,358,468 | 9/1944 | Mulhern | 301/108 R X |
| 2,607,632 | 7/1952 | Lyon. | |
| 2,865,678 | 12/1958 | Lyon. | |
| 3,022,112 | 2/1962 | Mulhern. | |
| 3,096,124 | 7/1963 | Frame et al. | 301/37 PB |
| 3,145,058 | 8/1964 | Demrick et al. | 301/37 B |
| 3,747,984 | 7/1973 | Andrews et al. | 301/37 P |
| 3,798,728 | 3/1974 | Beisch | 301/37 T X |
| 3,881,778 | 5/1975 | Buerger. | |
| 3,970,346 | 7/1976 | Kretschmer | 301/37 P X |
| 4,093,312 | 6/1978 | Kretschmer | 301/37 P X |
| 4,529,251 | 7/1985 | Schobbe | 301/37 P |

FOREIGN PATENT DOCUMENTS

| 830302 | 2/1952 | Fed. Rep. of Germany. | |
|---|---|---|---|
| 2402195 | 4/1975 | Fed. Rep. of Germany. | |
| 3239824 | 5/1984 | Fed. Rep. of Germany | 301/37 R |
| 1041268 | 10/1953 | France. | |
| 1272837 | 8/1961 | France. | |
| 2481197 | 10/1981 | France | 301/37 P |
| 718346 | 9/1959 | United Kingdom. | |

Primary Examiner—Robert B. Reeves
Assistant Examiner—Russell D. Stormer
Attorney, Agent, or Firm—Armstrong, Nikaido Marmelstein & Kubovcik

[57] ABSTRACT

A decorative wheel trim for an automobile wheel rim in which the wheel trim has a castellated decorative ring member (9) with resiliently deflectable castellation members (10A) adapted to engage under resilient deflection of the castellation members (10A) with the radially inner surface (11) of the hump (4) of the wheel rim (1) to retain the decorative ring member (9) in the area of the wheel rim bounded by the transversely outer flange (2) of the wheel rim (1) and the transversely outer corner (12) of the well (5) of the wheel rim (1), said castellation members 10(A) being interrupted by substantial non-deflecting members 26(B) having detent means for engagement with spring clips (36) as supplementary fastening means for retaining the trim to the wheel rim (1). The decorative ring member (9) includes a concentric substantially right-angle section (13) having a concentric base portion (14) for location transversely and radially outermost adjacent the radially inner surface (15) of said outer flange (2) of the wheel rim (1), and a castellated concentric flange portion (16) for location adjacent the radially inner surface (17) of the outer tire-bead seat (3) of the wheel rim (1) to engage under resilient deflection with the radially inner surface (11) of said hump (4) of the wheel rim (1). The castellation members (10A) have sufficient flexure in relation to the concentric flange portion (16) of the decorative ring member (9) as to be deflectable adequately for resilient spring movement of said castellation members (10A) to engage with the radially inner surface (11) of said hump (4) of the wheel rim (1) and retain the decorative ring member (9) in the specified area of the wheel rim (1).

9 Claims, 12 Drawing Figures

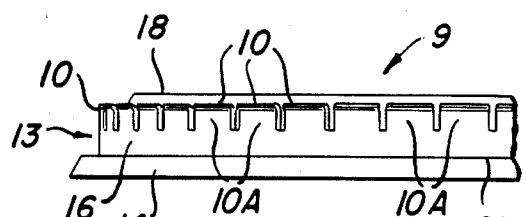
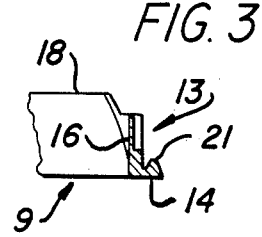
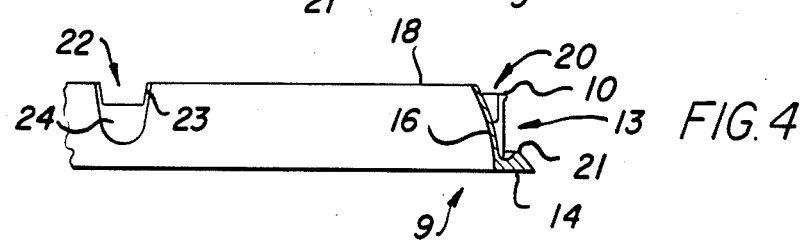
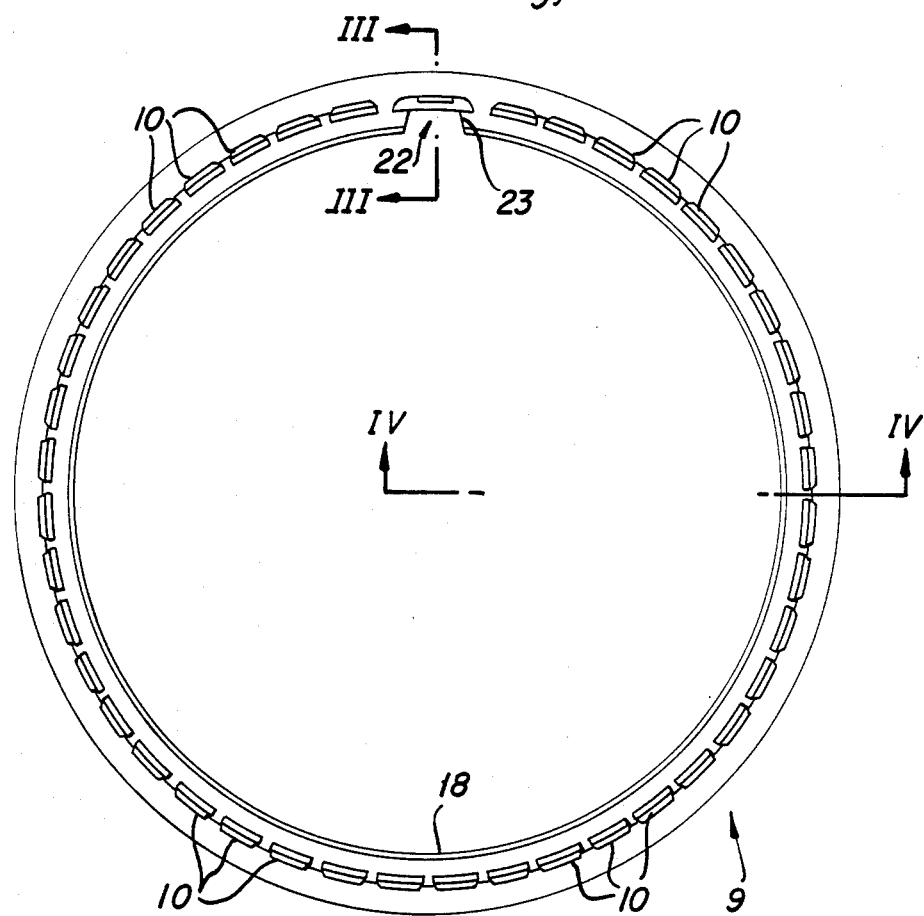

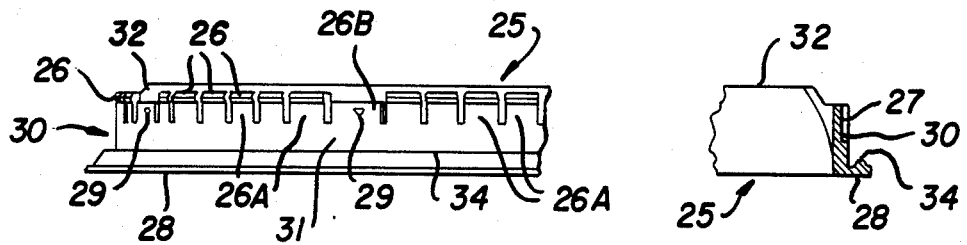
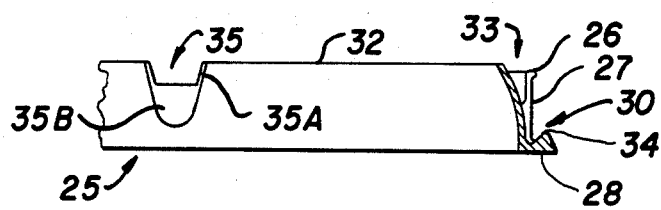
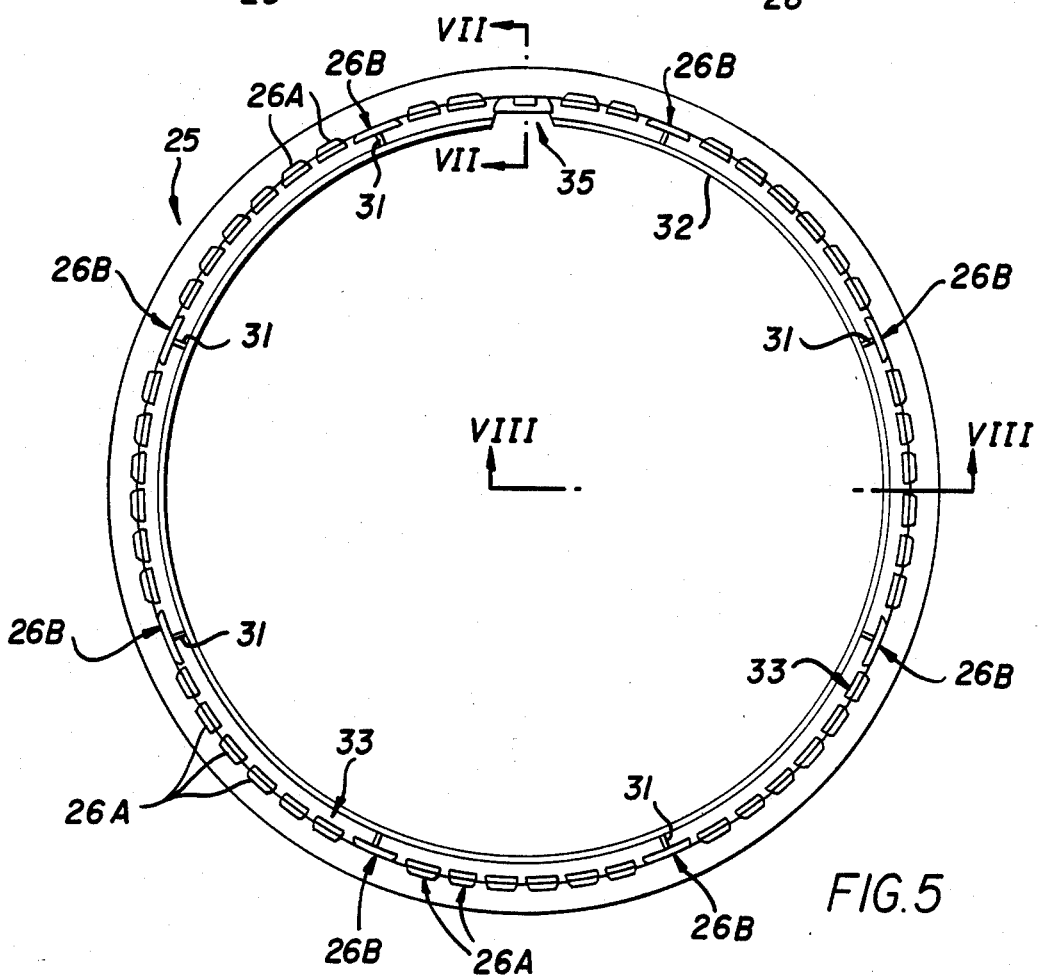

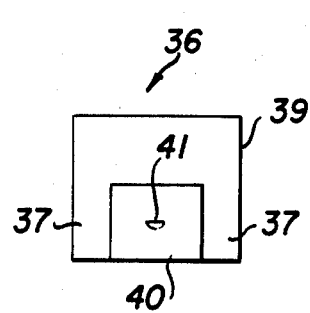 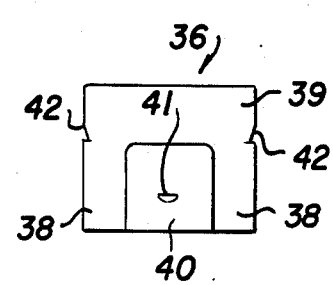 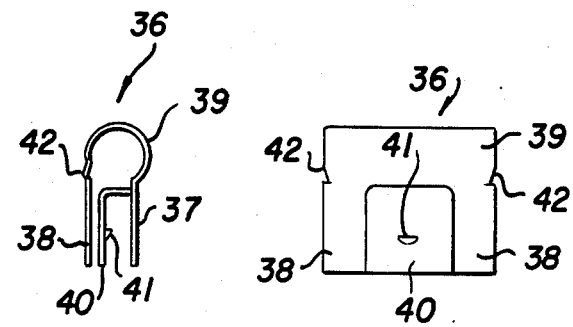
FIG.9  FIG.10  FIG.11
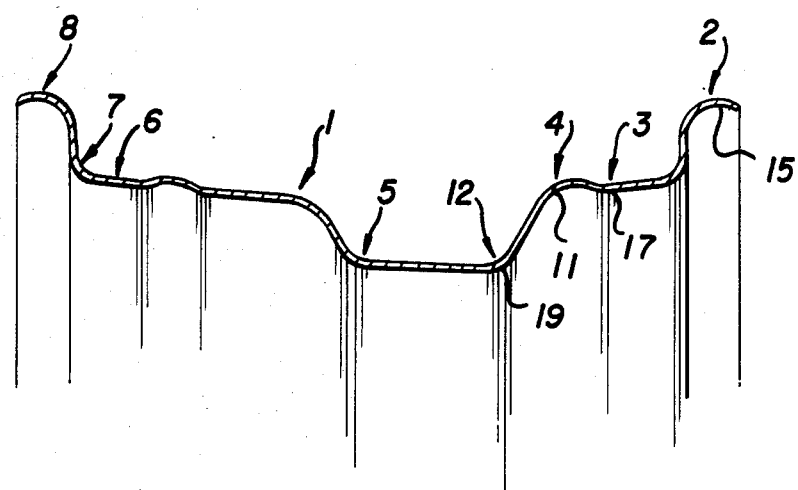
FIG.12

4,671,575

DECORATIVE WHEEL TRIM FOR AUTOMOBILE WHEEL RIM

BACKGROUND OF THE INVENTION

This invention relates to a decorative wheel ring fastening arrangement for use on a vehicle wheel, in particular, for fastening to a passenger vehicle wheel rim.

Various forms of decorative wheel rings and fastening arrangements for passenger vehicle wheel rims as known. One well-known such form of fastening means comprises an axially extending flange means on the ring and adapted to lie radially inwardly of the wheel flange when the ring is applied to the wheel, with means defining a plurality of clip-receiving recesses on the radially outer side of the flange means around the ring. Each of the recesses has an open axially inner end, with a spring clip for each recess, each clip comprising an interior portion inserted into and axially interlocked with its recess and an exterior portion extending exteriorly of its recess at the open axially inner end. Each exterior portion comprises a retaining finger extending both axially outwardly and radially outwardly for engagement with the wheel flange, the finger including a pair of circumferentially spaced, sharp pointed teeth projecting outwardly of the plane of the finger for biting engagement with the wheel flange. Each clip includes resilient means resiliently connecting its finger to the interior portion of its clip for enabling the finger to resiliently deflect toward its recess upon application of the ring to the wheel.

Although mechanically effective for the purpose, such form of fastening means is relatively complicated in construction and costly to produce. The present invention aims to provide a decorative wheel ring fastening means which is no less effective for the purpose and is simpler in construction and thus less costly to produce, the decorative wheel trim being fastened to the so-called hump of a passenger vehicle wheel rim.

Reference is made in this regard to the Tire and Rim Association of Australia 1980 Standards Manual, which sets out the basic terms used in relation to wheel rims, that is, in having in transverse cross section an axially concentric arcuate transversely outer flange, which merges into an axially concentric transversely outer tyre-bead seat, which in turn merges into an axially concentric hump, which in turn merges into an axially concentric well, which in turn merges into an axially concentric transversely inner tyre-bead seat, which in turn merges into an axially concentric heel, which in turn merges into an axially concentric arcuate transversely inner flange.

SUMMARY OF THE INVENTION

In accordance with the present invention, there is provided a decorative wheel trim suitable for an automobile wheel rim which in transverse cross section has an axially concentric arcuate transversely outer flange having a radially inner surface and merges into an axially concentric transversely outer tire-bead seat having a radially inner surfce and in turn merges into an axially concentric hump having a radially inner surface and in turn merges into an axially concentric well having a transversely outer corner, said decorative wheel trim comprising a decorative ring member in the form of a concentric right-angle section having a concentric base portion for location transversely and radially outermost adjacent the radially inner surface of said outer flange of the wheel rim, with a concentric flange portion having castellation members for location adjacent the radially inner surface of the outer tire-bead seat of the wheel rim, said castellation members outstanding from the flange portion of the concentric right-angle section of the ring member in alignment therewith and having a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable and each said castellation member having an end enlargement transversely at the inner marginal extremity of the castellation member for location to engage under resilient deflection of the castellation members with the radially inner surface of the bump of the wheel rim to retain the decorative wheel trim in position in the area of the wheel rim bounded by the transversely outer flange of the wheel rim and the transversely outer-corner of the well of the wheel rim.

Said castellation members may consist of an uninterrupted endless succession of resiliently deflectable members outstanding from the flange portion of the concentric right-angle section of the ring member in alignment therewith, each of a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable and also having an end enlargement transversely at the inner marginal extremity of the castellation member, whereby said ring member is wholly provided with resiliently deflectable castellation members having said end enlargements for location to engage under resilient deflection of the castellation members with the radially inner surface of the hump of the wheel rim to retain the decorative wheel trim in said position.

Alternatively, said castellation members may consist of an interrupted endless succession of resiliently deflectable members outstanding from the flange portion of the concentric righ-angle section of the ring member in alignment therewith, each of a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable and also having an end enlargement transversely at the inner marginal extremity of the castellation member, with a plurality of shortened and substantially non-deflecting members outstanding from the concentric flange portion of the ring member in alignment therewith and without an end enlargement at the transversely inner marginal extremity of each castellation member, periodically interrupting said endless succession of resiliently deflectable members having an end enlargement, whereby said ring member has a plurality of substantially non-deflecting castellation members withou an end enlargement and is only partially provided with said resiliently deflectable castellation members having an end enlargement for engagement under resilient deflection with the radially inner surface of said hump of the wheel rim to retain the decorative wheel trim in said position, and the radially outer faces of the plurality of shortened and substantially non-deflecting castellation members without an end enlargement transversely at the inner marginal extremities of the castellation members having detent means for engagement with a plurality of spring clips adapted to be fitted to said ring member as supplementary fastening means for engagement under resilient deflection with the radially inner surface of said hump of the wheel rim to retain the decorative wheel trim in said position.

The ring member may be in the form of a concentric right-angle section having a concentric base portion for location transversely and radially outermost adjacent the radially inner surface of said outer flange of the wheel rim, with a concentric flange portion having castellation members for location adjacent the radially inner surface of said outer tire-bead set of the wheel rim, said castellation members outstanding from the flange portion of the concentric right-angle section of the ring member in alignment therewith and having a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable and also having an end enlargement transversely at the inner marginal extremity of each castellation member for location to engage under resilient deflection of the castellation members with the radially inner surface of the hump of the wheel rim to retain the decorative wheel trim in said position, said flange portion also having a concentric radially inner-divergent elongation for location transversely and radially innermost adjacent the radially inner surface of the transversely outer corner of said well of the wheel rim and disposed to form a concentric channel-form recess between the castellation members and the concentric radially inner-divergent elongation extending from the junction of said flange portion, whereby flexure of the castellation members at their juncture with the flange portion is maintained and said castellation members are resiliently deflectable sufficiently in relation to said flange portion for said end enlargements to engage under resilient deflection with the radially inner surface of said hump of the wheel rim to retain the decorative wheel trim in said position.

The ring member may also be in the form of a concentric right-angle section having a concentric base portion for location transversely and radially outermost adjacent the radially inner surface of said outer flange of the wheel rim, with a concentric flange portion having castellation members for location adjacent the radially inner surface of said outer tire-bead seat of the wheel rim, the transversely inner face of said concentric base portion of the ring member having oppositely inclined surfaces forming a concentric ridge for location adjacent the radially inner face of the transversely outer flange of the wheel rim, said castellation members outstanding from the flange portion of the concentric right-angle section of the ring member in alignment therewith and having a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable and also having an end enlargement transversely at the inner marginal extremity of each castellation member for location to engage under resilient deflection of the castellation members with the radially inner surface of the hump of the wheel rim to retain the decorative wheel trim in said position, said flange portion also having a concentric radially inner-divergent elongation for location transversely and radially innermost adjacent the radially inner surface of the transversely outer corner of said well of the wheel rim and disposed to form a concentric channel-form recess between the castellation members and the concentric radially inner-divergent elongation extending from the junction of said flange portion, whereby flexure of the castellation members at their juncture with the flange portion is maintained and said castellation members are resiliently deflectable sufficiently in relation to the flange portion for said end enlargements to engage under resilient deflection with the radially inner surface of said bump of the wheel rim to retain the decorative wheel trim in said position.

In the case where the castellation members comprise a plurality of shortened and non-deflecting members outstanding from the concentric flange portion of the ring member, the construction of said ring member preferably is such that each shortened and substantially non-deflecting castellation member is joined to said concentric inner-divergent elongation of the flange portion of the concentric right-angle section of the ring member by a radially-disposed buttress member for strengthening each said shortened and substantially non-deflecting castellation member without an end enlargement, against distortion by the spring clips when they are under resilient deflection from biting engagement with the radially inner surface of said hump of the wheel rim.

PREFERRED EMBODIMENT OF THE INVENTION

According to a preferred embodiment of the present invention, said wheel trim comprises:

(I) a decorative ring member in the form of a concentric right-angle section having a concentric base portion for location transversely and radially outermost adjacent the radially inner surface of said outer flange of the wheel rim, with a concentric flange portion having castellation members for location adjacent the radially inner surface of the outer tire-bead seat of the wheel rim, said castellation members consisting of an interrupted endless succession of resiliently deflectable members outstanding from the flange portion of the concentric right-angel section of the ring member in alignment therewith, each of a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable and also having an end enlargement transversely at the inner marginal extremity of the castellation member for location to engage under resilient deflection of the castellation members with the radially inner surface of the hump of the wheel rim to retain the decorative wheel trim in position in the area of the wheel rim bounded by the transversely outer flange of the wheel rim and the transversely outer-corner of the well of the wheel rim, with a plurality of shortened and substantially non-deflecting members outstanding from the concentric flange portion of the ring member in alignment therewith and without an end enlargement at the transversely inner marginal extremity of each castellation member, periodically interrupting said endless succession of resiliently deflectable members having an end enlargement, whereby said ring member has a plurality of substantially non-deflecting castellation members without an end enlargement and is only partially provided with said resiliently deflectable castellation members having an end enlargement for engagement under resilient deflection with the radially inner surface of said hump of the wheel rim to retain the decorative wheel trim in said position, and the radially outer faces of the plurality of shortened and substantially non-deflecting castellation members without an end enlargement transversely at the inner margianl extremities of the castellation members having detent means for engagement with a plurality of spring clips adapted to be fitted to said ring member as secondary fastening means for engagement under resilient deflection with the radially inner surface of said hump of the wheel rim to retain the decorative wheel trim in said position; and (II) a plurality of spring clips as secondary fastening means each adapted to engage with said detent-engaging means on the radially outer face of each of the plurality of shortened and substantially non-deflecting castellation members without an end enlargement and to engage with the radially inner surface of said hump of the wheel rim to retain the decorative ring member in the area of the wheel rim bounded by said transversely outer flange of the wheel rim and a transversely outer-corner of said well of the wheel rim, each said spring clip comprising resiliently deflectable outer legs having sharp-pointed tooth-form notches for biting engagement with the radially inner surface of said hump of the wheel rim to function as the secondary fastening means to retain the decorative ring member in said position.

Each said spring clip preferably comprises resiliently deflectable inner legs adapted to lie against the radially inner face of one of the plurality of shortened and substantially non-deflecting castelaltion members without an end enlargement, a resiliently deflectable mid-leg adapted to lie against the radially outer face of said one of the shortened and substantially non-deflecting castellation members without said end enlargements and having a detent for engagement with said detent-engaging means on said one of the shortened and substantially non-deflecting castellation members without said end enlargements, and resiliently deflectable outer legs adapted to be located away from the radially outer face of said one of the shortened and substantially non-deflecting castellation members without said end enlargements and having sharp-pointed tooth-form notches for biting engagement with the radially inner surface of said hump of the wheel rim as secondary fastening means for the decorative ring member.

PRACTICAL EMBODIMENT OF THE INVENTION

A practical embodiment of a wheel trim in accordance with the present invention is illustraed in the accompanying drawings, in which:

FIG. 1 is a front elevational view of the decorative wheel trim according to the invention, in which the decorative ring member is wholly castellated;

FIG. 2 is a part slide elevational view of the decorative ring member shown in FIG. 1;

FIG. 3 is a part cross-sectional view taken at line III—III of FIG. 1;

FIG. 4 is a part cross-sectional view taken at line IV—IV of FIG. 3;

FIG. 5 is a front elevational view of the decorative wheel trim according to the invention, in which the decorative ring member is partially castellated;

FIG. 6 is a part side elevational view of the decorative ring member shown in FIG. 5;

FIG. 7 is a part cross-sectional view taken at line VII—VII of FIG. 5;

FIG. 8 is a part cross-sectional view taken at line VIII—VIII of FIG. 5;

FIG. 9 is a rear elevational view of a spring clip which can be used as fastening means for the decorative wheel trim shown in FIGS. 5-8;

FIG. 10 is a side elevational view of the spring clip shown in FIG. 9;

FIG. 11 is a front elevational view of the spring clip shown in FIGS. 9-10; and

FIG. 12 is a transverse outline of a passenger vehicle wheel rim to which the decorative wheel ring member of FIGS. 1-4, or the decorative ring member and spring clip fastening means of FIGS. 5-12 is especially adapted to be fitted.

Referring to the drawings, the decorative wheel trim illustrated therein is designed to be fastened to a passenger wheel rim 1 which in transverse cross section, consists of an axially concentric arcuate transversely outer flange 2, which merges into an axially concentric transversely outer tire-bead seat 3, which in turn merges into an axially concentric hump 4, which in turn merges into an axially concentric well 5, which in turn emerges into an axially concentric transversely inner tire-bead seat 6, which in turn merges into an axially concentric heel 7, which in turn merges into an axially concentric arcuate transversely inner flange 8.

In FIGS. 1-4 of the drawings, the decorative wheel trim comprises a wholly castellated decorative ring member 9 in which castellation enlargements 10 are adapted to engage with the radially inner surface 11 of said hump 4 of whe wheel rim 1 to retain the decorative ring member 9 in the area of the wheel rim 1 bounded by said transversely outer flange 2 of the wheel rim and the transversely outer corner 12 of the said well 5 of the wheel rim 1.

Said decorative ring member 9 comprises a concentric substantially right-angle section 13 having a concentric base portion 14 for location transversely and radially outermost adjacent the radially inner surface 15 of said outer flange 2 of the wheel rim 1, and a wholly castellated concentric flange portion 16 for location adjacent the radially inner surface 17 of said outer tire-bead seat 3 of the wheel rim 1 and having said castellation enlargements 10 at transversely inner marginal extremities of the castellations members 10A for location to engage under resilient deflection with the radially inner surface 11 of said hump 4 of the wheel rim 1, and a concentric radially inner-divergent elongation 18 of the concentric flange portion 16 for location transversely and radially innermost adjacent the radially inner surface of the transversely outer corner 12 of said well 5 of the wheel rim 1.

A concentric channel-form recess 20 is provided at the junction of said concentric flange portion 16 and said concentric inner-divergent elongation 18 so that the castellation members 10A can be resiliently deflected for spring engagement of said castellation enlargements 10 with the radially inner surface 11 of said hump 4 of the wheel rim 1.

Base portion 14 of the right-angle section 13 of the decorative ring member 9 is substantially equilateral or isoceles triangular in shape. The transversely inner face of said base portion 14 thereby has an apex forming a concentric ridge 21 adjacent the radially inner face 15 of the transversely outer flange 2 of the wheel rim.

The junction of the concentric flange portion 16 of the concentric substantially right-angle section 13 and the concentric inner divergent elongation 18 of the concentric flange portion 16 of the concentric substantially right-angle section 13 of said decorative ring member 9 is substantially V-shape. The resultant concentric slot of the V-shape, forms the channel-form rec3ess 20 at the transversely inner extremity of said concentric flange portion 16 and the divergent elongation 18 of said concentric flange portion 16, the junction area being relatively thicker than said concentric flange portion 16 and said divergent elongation 18 of the concentric flange portion 16 for the purpose.

A part 22 of the decorative ring member 9 is removed for not accommodating the tyre pneumatic valve not shown. A major portion of the removed part is a wholly removed area 23 of the concentric radially-inner divergent elongation 18 of the concentric flange portion 16, and a minor portion of the removed part is a partially removed area 24 of the radially inner surface of the concentric flange portion 16. The concentric channel-form recess 20 terminates on both sides of the partially removed area 24 of the radially inner surface of the concentric flange portion 16, in order not to weaken the decorative ring member 10 structurally at that area.

In use, the decorative ring member 9 of FIGS. 1-4 of the drawings is fitted to the wheel rim 1 by pressing said decorative ring member 9 transversely inwards until the ridge 21 of the base portion 14 of the right-angel section 13 of the decorative ring member 9 is adjacent the radially inner surface 15 of the transversely outer flange 2 of the wheel rim. The castellation enlargements 10 then frictionally engage under resilient deflection with the radially inner surface 11 of the hump 4 of the wheel rim, so as to retain the decorative ring member 9 in that position until a user desires to remove the decorative ring member 9 for replacement or other purposes.

Thereupon, the decorative ring member 9 may be removed from the wheel rim by exerting sufficeint force to overcome the frictional engagement of the castellation enlargements 10 under resilient deflection with the radially inner surface 11 of the hump 4 of the wheel rim, so as to allow the decorative ring member 9 to be retracted transversely outwardly of the wheel rim 1.

In FIGS. 5-8 of the drawings, the decorative wheel trim comprises a partially castellated decorative ring member 25 in which castellation enlargements 26 on a majority of the castellation members 26A are adapted to engage with the radially inner surface 11 of said hump 4 of the wheel rim 1 to retain the decorative ring member 25 in the area of the wheel rim 1 bounded by said transversely outer flange 2 of the wheel rim and the transversely outer corner 12 of the said well 5 of the wheel rim 1.

Said decorative ring member 25 comprises a concentric substantially right-angle section 27 having a concentric base portion 28 for location transversely and radially outermost adjacent the radially inner surface 15 of said outer flange 2 of the wheel rim 1, and a partially castellated concentric flange portion 30 for location adjacent the radially inner surface 17 of said outer tire-bead seat 3 of the wheel rim 1. The castellation enlargements 26 are disposed at transversely inner marginal extremities of a majority of the castellation members 26A for location to engage under resilient deflection with the radially inner surface 11 of said hump 4 of the wheel rim 1.

A number of shortened and substantially non-deflectable castellation members 26B without castellation enlargements at their transversely inner marginal extremities, periodically interrupt the endless succession of resiliently deflectable castellation members 26A with end enlargements 26, so that said ring member 25 has a plurality of castellation members without said end enlargements and is only partially provided with resiliently deflectable castellation members. Castellation members 26B without said castellation enlargements are conveniently circumferentially wider than castellation members 26A having said castellation enlargements 26 at their transversely inner marginal extremities.

A concentric radially inner-divergent elongation 32 of the concentric flange portion 30 extends for location transversely and radially innermost adjacent the radially inner surface of the transversely outer corner 12 of said well 5 of the wheel rim 1.

A concentric channel-form recess 33 is provided at the junction of said concentric flange portion 30 and said concentric inner-divergent elongation 32 so that the castellation members 26A can be resiliently deflected for spring engagement of said castellation enlargements 26 with the radially inner surface 11 of said hump 4 of the wheel rim 1.

The radially outer face of each shortened and substantially non-deflectable castellation member 26B has a detent-engaging identation 29 whereby a plurality of spring clips 36 can be fitted to the decorative ring member 25 as a supplementary fastening means adapted to engage with the radially inner surface 11 of said hump 4 of the wheel rim 1.

Base portion 28 of the right-angle section 27 of the decorative ring member 25 is substantially equilateral or isoceles triangular in shape. The transversely inner face of said base portion 28 thereby has an apex forming a concentric ridge 34 adjacent the radially inner face 15 of the transversely outer flange 2 of the wheel rim 1.

The junction of the concentric flange portion 30 of the concentric substantially right-angle section 27 and the concentric inner divergent elongation 32 of the concentric flange portion 30 of the concetric substantially right-angle section 27 of said decorative ring member 25 is substantially V-shape. The resultant concentric slot of the V-shape, forms the channel-form recess 33 at the transversely inner extremity of said concentric flange portion 30 and the divergent elongation 32 of said concentric flange portion 30, the junction area being relatively thicker than said concentric flange portion 30 and said divergent elongation 32 of the concentric flange portion 30 for the purpose.

A radially-disposed buttress member 31 joins each shortened and substantially non-deflectable castellation member 26B without an end enlargement to said concentric inner-divergent elongation 32 of the concentric flange portion.30 of said concentric substantially right-angle section 27 for strengthening each said shortened and substantially non-deflectable castellation member 26B without an end enlargement.

A part of the decorative ring member 25 is removed for accommodating the tire pneumatic valve not shown, a major portion of the removed part being a wholly removed area 35 of the concentric radially-inner divergent elongation 32 of the concentric flange portion 30, and a minor portion of the removed part being a partially removed area 35A of the radially inner surface of the concentric flange portion 30. The concentric channel-form recess 33 terminates on both sides of the partially removed area 35A of the radially inner surface of the concentric flange portion 30, in order not to weaken the decorative ring member 25 structurally at that area.

Each spring clip 36 is substantially U-shape and has inner legs 37 and outer legs 38 joined by a half-round return bend 39, with mid-leg 40 projecting from the half-round return bend into a plane substantially midway between the plane of the inner legs 37 and the plane of the outer legs 38.

In fabricating said spring clips 36, a central portion of one side of a U-shape can be displaced inwardly whereby the mid-leg 40 is formed, leaving undisplaced leg portions forming the inner legs 37 on both sides of the displaced central portion, a detent 41 being pressed into the mid-leg 40. A central portion of the other side of the U-shape sheet is expressed therefrom, leaving leg portions forming the outer legs 38, sharp-pointed tooth-form notches 42 being cut into the outer marginal edge of each outer leg 38 near the half-round return bend 39.

In use, the decorative ring member 25 of FIGS. 5-8 of the drawings has a plurality of the spring clips 36 fitted thereto by locating said inner legs 37 of the spring clip 36 in the channel-form recess 33 and pressing the spring clips 36 transversely inwardly whereby each said mid-leg 40 moves transversely inwardly along the radially outer face 35 of said concentric flange portion 30 until the detent means 41 in the mid-leg 40, engages with a corresponding indentation 29.

The assembly of the decorative ring member 25 and the plurality of spring clips 36 is then fitted to the wheel rim by pressing the assembly transversely inwards until the ridge 34 of the base portion 28 of the right-angle section 27 of the decorative ring member 25 is adjacent the radially inner surface 15 of the transversely outer flange 2 of the wheel rim. The castellation enlargements 26 then frictionally engage under resilient deflection with the radially inner surface 11 of the hump 4 of the wheel rim 1, while the sharp-pointed tooth-form notches 42 of the spring clips 36 bitingly engage with the radially inner surface 11 of the hump 4 of the wheel rim, so as to retain the decorative ring member 25 in that position until a user desires to remove the decorative ring member 25 for replacement or other purposes.

Thereupon, the decorative ring member 256 may be removed from the wheel rim 1 by exerting sufficient force to overcome the frictional engagement of said castellation enlargements 26A and the biting engagement of said sharp-pointed tooth-form notches 42 with the radially inner surface 11 of the hump 4 of the wheel rim, so as to allow the decorative ring member 25 to be retracted transversely outwardly of the wheel rim 1.

Persons skilled in the art will appreciate that the decorative wheel trim of the invention, in being indicated to be a ring member essentially comprising a concentric substantially right-angle section having a concentric base portion and a concentric flange portion and a concentric radially inner-divergent elongation of the concentric flange portion as described, may have a nave in the form of a convex-dished or similar disc-form decorative member fitting within the inner periphery of the ring member.

Said disc-form decorative member may have a continuous disc-form appearance or a non-continuous disc-form appearance, and may be integral with the ring member or non-integral with the ring member. For instance, said disc-form decorative member may have a solid convex disc appearance or may have a lattice or other open-work convex disc appearance. Also, said disc-form decorative member and the ring member may be in the form of an integral, single plastics moulding, in which the periphery of the disc-form decorative member extends from the inner periphery of the ring member, or said disc-form decorative member may be in the form of a non-integral, separate plastics moulding, which can be suitabely fixed within the inner periphery of the ring member, say by rivetting of a concentric flange of the disc-form decorative member to the concentric flange portion of the ring member.

We claim:

1. A decorative wheel trim suitable for an automobile wheel rim which in transverse cross section has an axially concentric arcuate transversely outer flange having a radially inner surface and merges into an axially concentric transversely outer tire-bead seat having a radially inner surface and in turn merges into an axially concentric hump having a radially inner surface and in turn merges into an axially concentric well having a transversely outer corner, said decorative wheel trim comprising:

(a) a decorative ring member in the form of a concentric right-angle section having a concentric base portion for location transversely and radially outermost adjacent the radially inner surface of said outer flange of the wheel rim, with a concentric flange portion having castellation members for location adjacent the radially inner surface of the outer tire-bead seat of the wheel rim;

(b) said castellation members outstanding from the flange portion of the concentric right-angle section of the ring member in alignment therewith and having a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable; and (c) each said castellation member having an end enlargement transversely at the inner marginal extremity of the castellation member for location to engage under resilient deflection of the castellation members with the radially inner surface of the hump of the wheel rim to retain the decorative wheel trim in position in the area of the wheel rim bounded by the transversely outer flange of the wheel rim and the transversely outer-corner of the well of the wheel rim;

(d) said castelaltion members consisting of an interrupted endless succession of resiliently deflectable members outstanding from the flange portion of the concentric right-angle section of the ring member in alignment therewtih, each of a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectble and also having an end enlargement transversely at the inner marginal extremity of the castellation member;

(e) a plurality of shortened and substantially non-deflecting members outstanding from the concentric flange portion of the ring member in alignment therewith and without an end enlargement at the transversely inner marginal extremity of each castellation member, periodically interrupting said endless succession of resiliently deflectable members having an end enlargement, whereby said ring member has a plurality of substantially non-deflecting castellation members without an end enlargement and is only partially provided with said resiliently deflectable castellation members having an end enlargement for engagement under resilient deflection with the radially inner surface of said hump of the wheel rim to retain the decorative wheel trim in said position, and the radially outer faces of the plurality of shortened and substantially non-deflecting castellation members without an end enlargement transversely at the inner marginal extremities of the castellation members having detent means for engagement with a plurality of spring clips adapted to be fitted to said ring member as supplementary fastening means for engagement under resilient deflection with the radially inner surface of said hump of the wheel rim to retain the decorative wheel trim in said position.

2. A decorative wheel trim as claimed in claim 1, wherein said flange portion also has a concentric radially inner-divergent elongation for location transversely and radially innermost adjacent the radially inner surface of the transversely outer corner of said well of the wheel rim and disposed to form a concentric channel-form reces between the castellation members and the concentric radially inner-divergent elongation extending from the junction of said flange portion, whereby flexure of the castellation members at their juncture with the flange portion is maintained and said castellation members are resiliently deflectable sufficiently in relation to said flange portion for said end enlargements to engage under resilient deflection with the radially inner surface of said hump of the wheel rim to retain the decorative wheel trim in said position;

(b) said castellation members consist of an interrupted endless succession of resiliently deflectable members outstanding from the flange portion of the concentric right-angle section of the ring member in alignment therewith, each of a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable and also having an end enlargement transversely at the inner marginal extremity of the castellation member, with a plurality of shortened and substantially non-deflecting members outstanding from the concentric flange portion of the ring member in alignment therewith and without an end enlargement at the transversely inner marginal extremity of each castellation member, periodically interrupting said endless succession of resiliently deflectable members having an end enlargement, whereby said ring member has a plurality of substantially non-deflecting castellation members without an end enlargement and is only partially provided with said resiliently deflectable castellation members having end enlargement for engagement under resilient deflection with the radially inner surface of said hump of the wheel rim to retain the decorative wheel trim in said position; and (c) the radially outer faces of the plurality of shortened and substantially non-deflecting castellation members without an end enlargement transversely at the inner marginal extremities of the castellation members having detent means for engagement with a plurality of spring clips adapted to be fitted to said ring member as supplementary fastening means for engagement under resilient deflection with the radially inner surface of said hump of the wheel rim to retain the decorative wheel trim in said position.

3. A decorative wheel trim as claimed in claim 1, wherein the castellation members consist of an interrupted endless succession of resiliently deflectable members outstanding from the flange portion of the concentric right-angle section of the ring member in alignment therewith, each of a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable and also having an end enlargement transversely at the inner marginal extremity of the castellation member, with a plurality of shortened and substantially non-deflecting members outstanding from the concentric flange portion of the ring member in alignment therewith and without an end enlargement at the transversely inner marginal extremity of each castellation member, periodically interrupting said endless succession of resiliently deflectable members having an end enlargement, a radially-disposed buttress member joining each shortened and substantially non-deflecting castelaltion member to said concentric inner-divergent elongation of the flange portion of the concentric right-angle section of the ring member for strengthening each said shortened and substantially non-deflecting castellation member without an end enlargement, whereby said ring member has a plurality of substantially non-deflecting castellation members without an end enlargement and is only partially provided with said resiliently deflectable castellation members having end enlargement for engagement under resilient deflection with the radially inner surface of said hump of the wheel rim to retain the decorative wheel trim in said position, and the radially outer faces of the plurality of shortened and substantially non-deflecting castellation members without an end enlargement transversely at the inner marginal extremities of the castelaltion members having detent means for engagement with a plurality of spring clips adapted to be fitted to said ring member as supplementary fastening means for engagement under resilient deflection with the radially inner surface of said hump of the wheel rim to retain the decorative wheel trim in said position.

4. A decorative wheel trim suitable for an automobile wheel rim which in transverse cross section has an axially concentric arcuate transversely outer flange having a radially inner surface and merges into an axially concentric transversely outer tire-bead seat having a radially inner surface and in turn merges into an axially concentric hump having a radially inner surface and in turn merges into an axially concentric well having a transversely outer-corner, said decorative wheel trim comprising:

(I) a decorative ring member in the form of a concentric right-angle section having a concentric base portion for location transversely and radially outermost adjacent the radially inner surface of said outer flange of the wheel rim, with a concentric flange portion having castellation members for location adjacent the radially inner surface of the outer tire-bead seat of the wheel rim, said castellation members consisting of an interrupted endless succession of resiliently deflectable members outstanding from the flange portion of the concentric right-angle section of the ring member in alignment therewith, each of a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable and also having an end enlargement transversely at the inner marginal extremity of the castellation member for location to engage under resilient deflection of the castellation members with the radially inner surface of the hump of the wheel rim to retain the decorative wheel trim in position in the area of the wheel rim bounded by the transversely outer flange of the wheel rim and the transversely outer-corner of the well of the wheel rim, with a plurality of shortened and substantially non-deflecting members outstanding from the concentric flange portion of the ring member in alignment therewith and without an end enlargement at the transversely inner marginal extremity of each castellation member, periodically interrupting said endless succession of resiliently deflectable members having an end enlargement, whereby said ring member has a plurality of substantially non-deflecting castellation members without an end enlargement and is only partially provided with said resiliently deflectable castellation members having an end enlargement for engagement under resilient deflection with the radially inner surface of said hump of the wheel rim to retain the decorative wheel trim in said position, and the radially outer faces of the plurality of shortened and substantially non-deflecting castellation members without an end enlargement transversely at the inner marginal extremities of the castellation members having detent means for engagement with a plurality of spring clips adapted to be fitted to said ring member as secondary fastening means for engagement under resilient deflection with the radially inner surface of said hump of the wheel rim to retain the decorative wheel trim in said position; and (II) a plurality of spring clips as secondary fastening means each adapted to engage with said detent-engaging means on the radially outer face of each of the plurality of shortened and substantially non-deflecting castellation members without an end enlargement and to engage with the radially inner surface of said hump of the wheel rim to retain the decorative ring member in the area of the wheel rim bounded by said transversely outer flange of the wheel rim and a transversely outer-corner of said well of the wheel rim, each said spring clip comprising resiliently deflectable outer legs having sharp-pointed tooth-form notches for biting engagement with the radially inner surface of said bump of the wheel rim to function as the secondary fastening means to retain the decorative ring member in said position.

5. A decorative wheel trim as claimed in claim 4 wherein each said spring clip comprises resiliently deflectable inner legs adapted to lie against the radially inner face of one of the plurality of shortened and substantially non-deflecting castellation members without an end enlargement, a resiliently deflectable mid-leg adapted to lie against the radially outer face of said one of the shortened and substantially non-deflecting castellation members without said end enlargements and having a detent for engagement with said detent-engaging means on said one of the shortened and substantially non-deflecting castellation members without said end enlargements, and resiliently deflectable outer legs adapted to be located away from the radially outer face of said one of the shortened and substantially non-deflecting castellation members without said end enlargements and having sharp-pointed tooth-form notches for biting engagement with the radially inner surface of said hump of the wheel rim as secondary fastening means for the decorative ring member.

6. A decorative wheel trim as claimed in claim 4 wherein ther ing member is in form of a concentric right-angle section having a concentric base portion for location transversely and radially outermost adjacent the radially inner surface of said outer flange of the wheel rim, with a concentric flange portion having castellation members for location adjacent the radially inner surface of said outer tire-bead seat of the wheel rim, said castellation members consisting of an interrupted endless succession of resiliently deflectable members outstanding from the flange portion of the concentric right-angle section of the ring member in alignment therwith, each of a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable and also having an end enlargement transversely at the inner marginal extremity of the castellation member, with a plurality of shortened and substantially non-deflecting members outstanding from the concentric flange portion of the ring member in alignment therewith and without an end enlargement at the transversely inner marginal extremity of each castellation member, periodically interrupting said endless succession of resiliently deflectable members having an end enlargement, whereby said ring member has a plurality of substantially non-deflecting castellation members without an end enlargement and is only partially provided with said resiliently deflectable castellation members having an end enlargement for engagement under resilient deflection with the radially inner surface of said hump of the wheel rim to retain the decorative wheel trim in said position, and the radially outer faces of the plurality of shortened and substantially non-deflecting castellation members without an end enlargement transversely at the inner marginal extremities of the castellation members having detent means for engagement with a plurality of spring clips adapted to be fitted to said ring member as secondary fastening means for engagement under resilient deflection wtih the radially inner surface of said hump of the wheel rim to retain the decorative wheel trim in said position, said flange portion also having a concentric radially inner-divergent elongation for location transversely and radially innermost adjacent the radially inner surface of the transversely outer corner of said well of the wheel rim and disposed to form a concentric channel-form recess between the castellation members and the concentric radially inner-divergent elongation extending from the junction of said flange portion, whereby flexure of the castellation members at their juncture with the flange portion is maintained and said castellation members are resiliently deflectable sufficiently in relation to the flange portion for said end enlargements to engage under resilient deflection with the radially inner surface of said hump of the wheel rim to retain the decorative wheel trim in said position.

7. A decorative wheel trim as claimed in claim 4 wherein ther ing member is in the form of a concentric right-angle section having a concentric base portion for location transversely and radially outermost adjacent the radially inner surface of said outer flange of the wheel rim, with a concentric flange portion having castellation members for location adjacent the radially inner surface of said outer tire-bead seat of the wheel rim, the transversely inner face of said concentric base portion of the ring member having oppositely inclined surfaces forming a concentric ridge for location adjacent the radially inner face of the transversely outer flange of the wheel rim, said castellation members consisting of an-interrupted endless succession of resiliently deflectable members outstanding from the flange portion of the concentric right-angle section of the ring member in alignment therewith, each of a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable and also having an end enlargement transversely at the inner marginal extremity of the castellation member, with a plurality of shortened and substantially non-deflecting members outstanding from the concentric flange portion of the ring member in alignment therewith and without an end enlargement at the transversely inner marginal extremity of each castellation member, periodically interrupting said endless succession of resiliently deflectable members having an end enlargement, whereby said ring member has a plurality of substantially non-deflecting castellation members without an end enlargement and is only partially provided with said resiliently deflectable castellation members having an end enlargement for engagement under resilient defelction with the radially inner surface of said hump of the wheel rim to retain the decorative wheel trim in said position, and the radially outer faces of the plurality of shortened and substantially non-deflecting castellation members without an end enlargement transversely at the inner marginal extremities of the castellation members having detent means for engagement with a plurality of spring clips adapted to be fitted to said ring member as secondary fastening means for engagement under resilient deflection with the radially inner surface of said hump of the wheel rim to retain the decorative wheel trim in said portion.

8. A decorative wheel trim as claimed in claim 4 wherein the ring member is in the form of a concentric right-angle section having a concentric base portion for location transversely and radially outermost adjacent the radially inner surface of said outer flange of the wheel rim, with a concentric flange portion having castellation members for location adjacent the radially inner surface of said outer tire-bead seat of the wheel rim, the transversely inner face of said concentric base portion of the ring member having oppositely inclined surfaces forming a concentric ridge for location adjacent the radially inner face of the transversely outer flange of the wheel rim, said castellation members consisting of an interrupted endless succession of resiliently deflectable members outstanding from the flange portion of the concentric right-angle section of the ring member in alignment therewith, each of a thickness materially less than the thickness of the flange portion of the concentric right-angle section of the ring member so that the castellation members can flex at their juncture with the flange portion of said concentric right-angle section of the ring member sufficiently in relation to said flange portion as to be resiliently deflectable and also having an end enlargement transversely at the inner marginal extremity of the castellation member, with a plurality of shortened and substantially non-deflecting members outstanding from the concentric flange portion of the ring member in alignment therewith and without an end enlargement at the transversely inner marginal extremity of each castellation member, periodically interrupting said endless succession of resiliently deflectable members having an end enlargement, whereby said ring member has a plurality of substantially non-deflecting castellation members without an end enlargement and is only partially provided with said resiliently deflectable castellation members having an end enlargement for engagement under resilient deflection with the radially inner surface of said hump of the wheel rim to retain the decorative wheel trim in said position, and the radially outer faces of the plurality of shortened and substantially non-deflecting castellation members without an end enlargement transversely at the inner marginal extremities of the castellation members having detent means for engagement with a plurality of spring clips adapted to be fitted to said ring member as secondary fastening means for engagement under resilient deflection with the radially inner surface of said hump of the wheel rim to retain the decorative wheel trim in said position, said flange portion also having a concentric radially inner-divergent elongation for location transversely and radially innermost adjacent the radially inner surface of the transversely outer corner of said well of the wheel rim and disposed to form a concentric channel-form recess between the castellation members and the concentric radially inner-divergent elongation extending from the junction of said flange portion with a radially-disposed buttress member joining each shortened and substantially non-deflecting castellation member to said concentric inner-divergent elongation of the flange portion of the concentric right-angle section of the ring member for strengthening each said shortened and substantially no-deflecting castellation member without an end enlargement, whereby flexure of the castellation members at their juncture with the flange portion is maintained and said castellation members are resiliently deflectable sufficiently in relation to the flange portion for said end enlargements to engage under resilient deflection with the radially inner surface of said hump of the wheel rim to retain the decorative wheel trim in said position.

9. A decorative wheel trim as claimed in claim 8 wherein each said spring clip comprises resiliently deflectable inner legs adapted to lie against the radially inner face of one of the plurality of shortened and substantially non-deflecting castellation members without an end enlargement, a resiliently deflectable mid-leg adapted to lie against the radiallyouter face of said one of the shortened and substantially non-deflecting castellation members without said end enlargements and having a detent for engagement with said detent-engaging means on said one of the shortened and substantially non-deflecting castellation members without said end enlargements, and resiliently deflectable outer legs adapted to be located away from the radially outer face of said one of the shortened and substantially non-deflecting castellation members without said end enlargements and having sharp-pointed tooth-form notches for biting engagement with the radially inner surface of said hump of the wheel rim as secondary fastening means for the decorative ring member.

\* \* \* \* \*